US006518968B1

(12) United States Patent
Ritter et al.

(10) Patent No.: US 6,518,968 B1
(45) Date of Patent: Feb. 11, 2003

(54) METHOD AND APPARATUS FOR PERFORMING H-SPACE BUMP MAPPING SUITABLE FOR IMPLEMENTATION WITH H-SPACE LIGHTING IN A GRAPHICS PIPELINE OF A COMPUTER GRAPHICS DISPLAY SYSTEM

(75) Inventors: Bradford A. Ritter, Fort Collins, CO (US); Ross Cunniff, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/573,059

(22) Filed: May 17, 2000

(51) Int. Cl.$^7$ ............................................. G06T 17/06
(52) U.S. Cl. ....................................................... 345/426
(58) Field of Search ................................ 345/418, 419, 345/426, 427

(56) References Cited

U.S. PATENT DOCUMENTS

| | | | | |
|---|---|---|---|---|
| 5,956,042 A | * | 9/1999 | Tucker et al. | 345/426 |
| 6,188,409 B1 | * | 2/2001 | Pajarre et al. | 345/430 |
| 6,226,006 B1 | * | 5/2001 | Collodi | 345/426 |
| 6,297,833 B1 | * | 10/2001 | Ho et al. | 345/581 |

* cited by examiner

Primary Examiner—Cliff N. Vo

(57) ABSTRACT

The present invention provides a method and apparatus for performing H-space bump mapping. The apparatus of the present invention is a fragment processor of a computer graphics display system. The method of the present invention is performed by the fragment processor. In accordance with the method of the present invention, for each vertex of each polygon being processed, the fragment processor calculates both diffuse and specular lighting terms. Then, for each fragment within the polygon defined by the vertices, the fragment processor interpolates the specular and diffuse lighting terms to obtain diffuse and specular lighting terms for each fragment. If bump mapping has been enabled, the fragment processor adds perturbations to the diffuse and specular lighting terms to generate the bump mapping. Preferably, prior to performing the H-space bump mapping algorithm, texture coordinate gradient vectors are calculated for the image to be rendered. During the H-space bump mapping algorithm of the present invention, the H-space reference vectors are aligned with the texture coordinate gradient vectors. The specular and diffuse lighting terms are calculated using the H-space reference vectors. Since the H-space reference vectors are aligned with the texture coordinate vectors, it is not necessary to transform the specular and diffuse lighting terms into the coordinate system associated with the texture coordinates of the bump map on a per fragment (i.e., per pixel basis). Once the H-space reference vectors have been aligned with the texture coordinate gradient vectors, the algorithm proceeds in the aforementioned manner.

26 Claims, 6 Drawing Sheets

METHOD AND APPARATUS FOR PERFORMING H-SPACE BUMP MAPPING SUITABLE FOR IMPLEMENTATION WITH H-SPACE LIGHTING IN A GRAPHICS PIPELINE OF A COMPUTER GRAPHICS DISPLAY SYSTEM

TECHNICAL FIELD OF THE INVENTION

The present invention generally relates to computer graphics display systems and, more particularly, to a method and apparatus for performing H-space Bump Mapping that is suitable for implementation with H-space lighting, previously developed by HP-Labs, in a fragment processor of a graphics pipeline of a computer graphics display system.

BACKGROUND OF THE INVENTION

Computer graphics display systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics system and a graphics display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are generated in terms of primitive data by software being executed by the host CPU. For example, when the primitive is a triangle, the software being executed by the host computer defines the primitive in terms of the X, Y and Z coordinates of its vertices, the normals of the vertices, $N_x$, $N_y$ and $N_z$, and the red, green, blue and alpha (R, G, B and α) color values of each vertex. Alpha is a transparency value. Additional primitive data may be used in specific applications. Rendering hardware interpolates all of this data to compute the display screen pixels that represent each primitive, and the R, G, B and α values for each pixel.

The graphics system is typically implemented in hardware and generally includes a geometry accelerator, a rasterizer, a frame buffer controller and a frame buffer memory. The graphics system typically also includes texture mapping hardware. In cases where the graphics system comprises a geometry accelerator, the geometry accelerator receives vertex data from the host CPU that defines the primitives that make up the view to be displayed. Many of the tasks performed by the graphics accelerator in hardware may instead be performed in software being executed on the host CPU. However, in many cases, the graphics accelerator is preferred because it is normally capable of performing these tasks faster than the host computer, thus increasing the overall rendering speed of the computer graphics display system.

The geometry accelerator typically comprises a transform component, which receives vertex data from the host CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is retained for further processing. The illumination component calculates the final colors of the vertices of the primitives based on the vertex data and based on lighting conditions. The plane equations component generates floating point equations that define the image space within the vertices. The floating point equations are later converted into fixed point equations by a floating point-to-fixed point component. A rasterizer, which is generally viewed as being external to the graphics accelerator, receives the output of the plane equations component of the graphics accelerator. The rasterizer generally interpolates the values of the pixels within the interior of each primitive defined by the vertices output from the geometry accelerator.

A fragment processor component receives the output of the rasterizer and generates the final screen coordinate and color data for each pixel in each primitive. The fragment processor comprises a texture mapping component, which performs texture mapping, and a fragment lighting component, which computes the actual values of each of the pixels within each of the primitives. This is to be distinguished from the process performed by the rasterizer of interpolating the pixel values of the primitives. The aforementioned technique known as H-space lighting may be used by the fragment lighting component to perform lighting of the scene. H-space lighting is a less computationally expensive technique for achieving effects that are generally equivalent to the effects achieved by a well-known lighting technique generally referred to as Phong lighting. Both of these techniques are algorithms that perform lighting on a per-pixel basis for an entire scene.

It is known to have the fragment lighting component also perform a technique known as bump mapping in conjunction with the Phong lighting technique. Bump mapping is a technique that provides lighting effects that show the texture of the surface in such a way that the light and dark areas on the surface generated by the lighting will change in accordance with changes in the positioning of the light source in the scene. Utilizing bump mapping with Phong lighting further increases the computational overhead associated with the functions performed by the fragment lighting component of the fragment processor, which affects the overall rendering speed of the computer graphics display system.

Since H-space lighting is less computationally expensive than Phong lighting, it would be advantageous to provide a bump mapping technique that can be used in conjunction with H-space lighting and that is less computationally expensive than the bump mapping technique utilized with the Phong lighting technique. Accordingly, a need exists for a method and apparatus that utilize a computationally inexpensive bump mapping technique in conjunction with H-space lighting in order to maximize the speed with which the computations of the fragment processor can be performed, thereby increasing the overall processing speed of the computer graphics display system.

SUMMARY OF THE INVENTION

The present invention provides a method and apparatus for performing H-space bump mapping. The apparatus of the present invention is a fragment processor of a computer graphics display system. The method of the present invention is performed by the fragment processor. In accordance with the method of the present invention, for each vertex of each polygon being processed, the fragment processor calculates both diffuse and specular lighting terms. Then, for each fragment within the polygon defined by the vertices, the fragment processor interpolates the specular and diffuse lighting terms to obtain diffuse and specular lighting terms for each fragment. If bump mapping has been enabled, the fragment processor adds perturbations to the interpolated diffuse and specular lighting terms to generate the bump mapping for each fragment. The color of each fragment is then determined using information relating to the bump mapped image.

In accordance with the preferred embodiment of the present invention, prior to performing the H-space bump mapping algorithm, texture coordinate gradient vectors are calculated for the image to be rendered. During the H-space bump mapping algorithm of the present invention, the H-space reference vectors are aligned with the texture coordinate gradient vectors. The specular and diffuse lighting terms are calculated using the H-space reference vectors. Since the H-space reference vectors are aligned with the texture coordinate gradient vectors, it is not necessary to transform the specular and diffuse lighting terms into the coordinate system associated with the texture coordinates of the bump map on a per fragment (i.e., per pixel basis). Once the H-space reference vectors have been aligned with the texture coordinate gradient vectors, the algorithm proceeds in the aforementioned manner.

These and other features and advantages of the present invention will become apparent to those skilled in the art from the following discussion, figures and claims.

BRIEF DESCRIPTION OF THE DRAWINGS

FIGS. 3, 4 and 5, taken together, demonstrate that bump mapping should be applied to both the specular and diffuse lighting components.

DETAILED DESCRIPTION OF THE INVENTION

Figure 1:
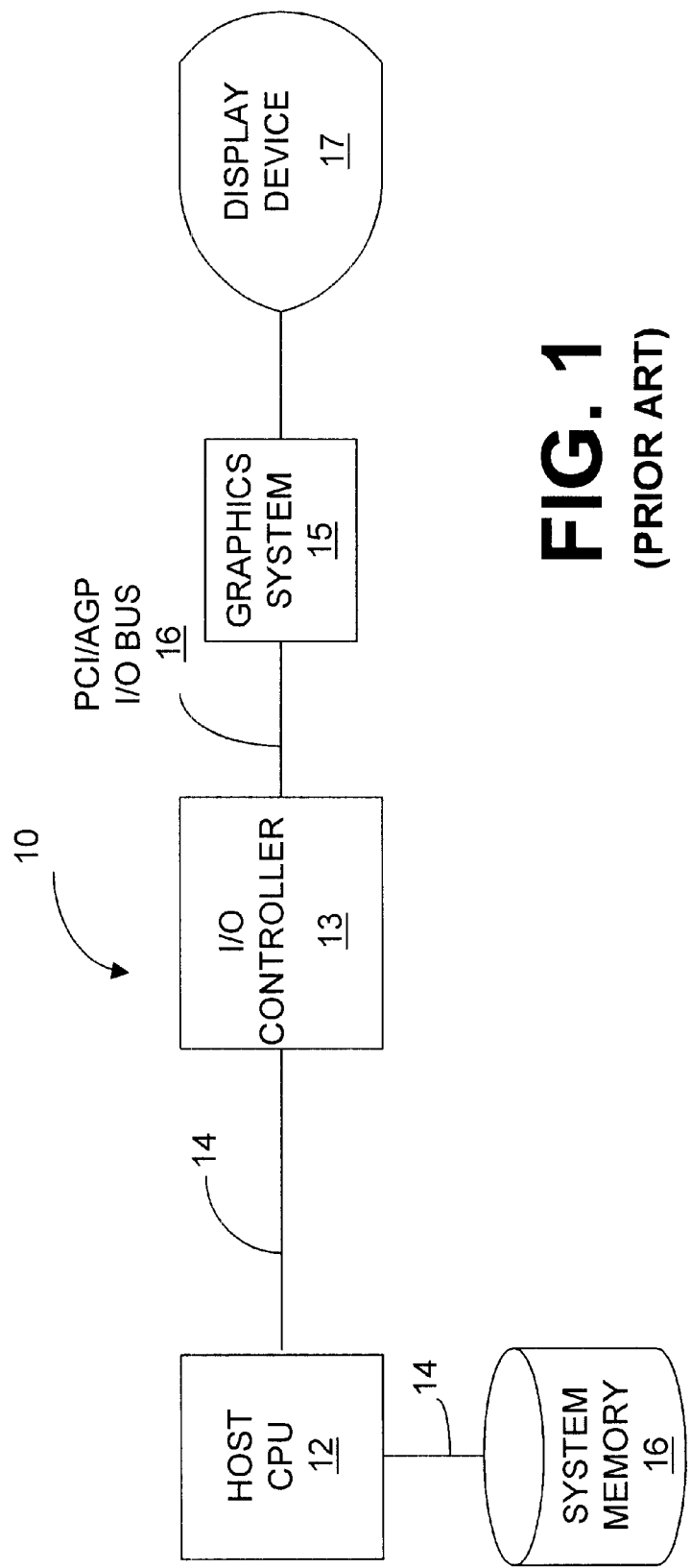
FIG. 1 illustrates a functional block diagram of a typical computer graphics display system.

The components of the computer graphics display system 10 of the invention are shown in FIG. 1. The computer graphics display system 10 comprises a host CPU 12 connected to an input/output (I/O) controller 13, a graphics system 15, a system memory device 16 and a display device 17. The CPU 12 communicates with the system memory 16 and the I/O controller via a system bus 14. The graphics system 15 communicates with the I/O controller 13 via I/O bus 16. A user (not shown) may communicate with the CPU 12 via a peripheral input device, such as a keyboard or mouse, to generate and/or manipulate an image being rendered on the display device 17.

Figure 2:
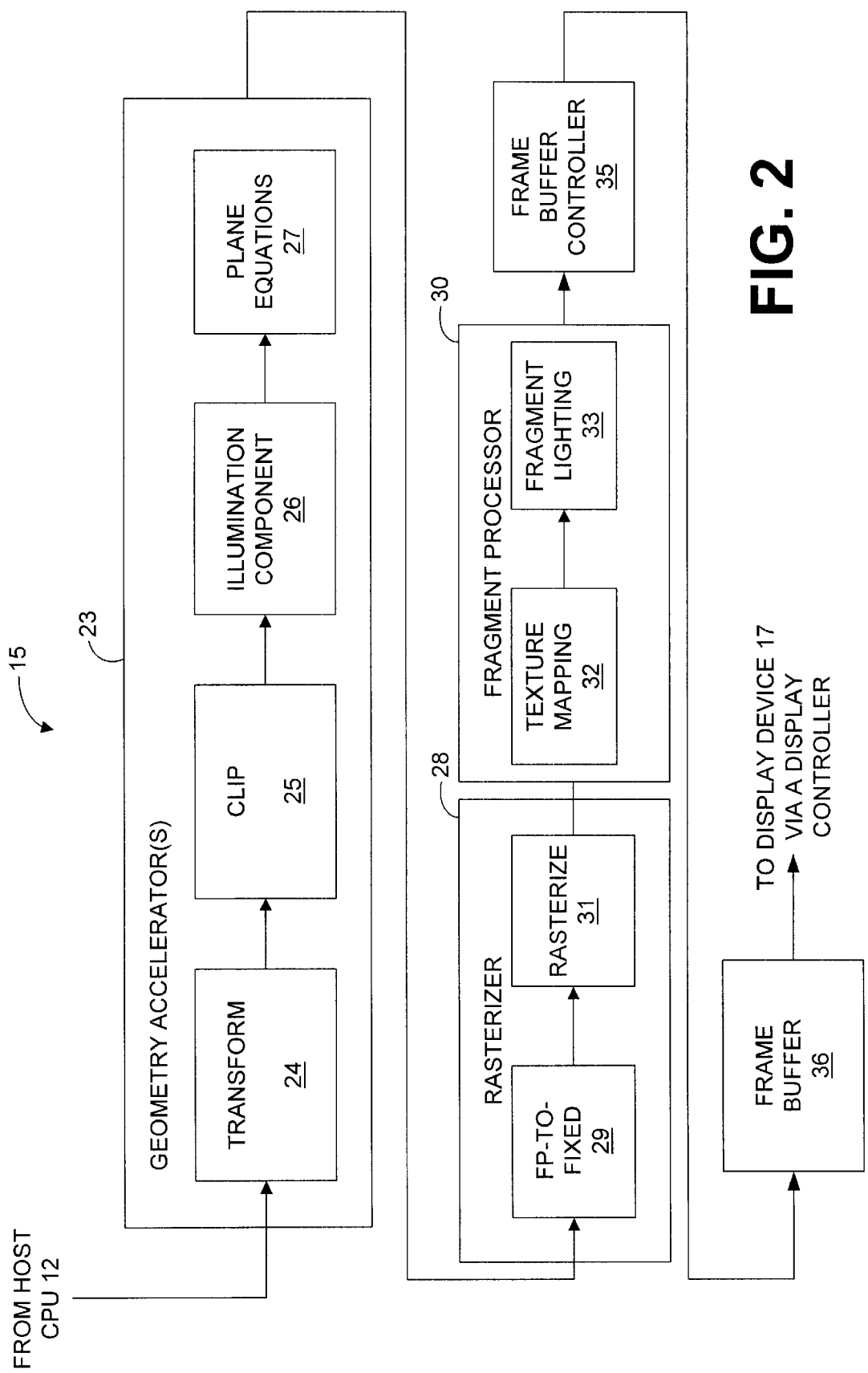
FIG. 2 illustrates a functional block diagram of the geometry accelerator and rasterizer of the graphics system 15 shown in FIG. 1 in accordance with the preferred embodiment.

The components of the graphics system 15 of the computer graphics display system 10 are shown in FIG. 2. The graphics system 15 preferably comprises a geometry accelerator 23, a rasterizer 28, a fragment processor 30, a frame buffer controller 35, and a frame buffer 36, which outputs image information to a display controller that causes images to be displayed on the display device 17 shown in FIG. 1. The graphics system 15 may also include texture mapping hardware (not shown). The geometry accelerator 23 receives data from the host CPU 12 that defines the primitives (e.g., triangles) that make up the view to be displayed. The geometry accelerator 23 typically comprises a transform component 24, a clipping component 25, an illumination component 26, and a plane equations component 27.

The transform component 24 receives vertex data and commands from the CPU 12 and performs transformations on the vertex data, such as rotation, translation, or scaling (or a combination of these operations) of the image space defined by the vertex data. The clipping component 25 clips the vertex data so that only vertex data relating to primitives that make up the portion of the view that will be seen by the user is further processed through the graphics pipeline. All other vertex data may be tossed. This may be accomplished by determining whether any of the vertex coordinates of any primitive are located outside of the image space that will be seen by the user. If so, the primitive may be clipped so that only the vertex data corresponding to the portion of the primitive inside of the image space is kept for further processing. The illumination component 26 calculates the final colors of the vertices of the primitives based on the vertex data and lighting parameters provided to the illumination component 26. The plane equations component 27 generates floating point equations that define the image space within the vertices of each primitive.

The rasterizer 28 comprises the floating point-to-fixed point component 29 and a rasterizer component 31. The floating point equations are then converted into fixed point equations by floating point-to-fixed point component 29 before being rasterized by the rasterizer component 31. All of the components 24–31 of the graphics system 15 described thus far that perform the aforementioned functions are generally known in the art. Therefore, these components will not be described in further detail in the interest of brevity. Furthermore, these components are not limited to any particular hardware or software for performing these functions in the graphics system 15. It should also be noted that the functions performed by one or more of these components may be performed in software in the CPU 12, as will be understood by those skilled in the art. Preferably, the functions performed by these components are performed in hardware in the graphics system 15 because doing so normally increases the speed of the graphics pipeline.

The H-space lighting technique utilized in conjunction with the H-space bump mapping technique of the present invention will now be discussed with reference to pseudo code that represents the algorithm for performing the H-space lighting functions. H-space lighting generally is a technique that can be used to produce more realistic specular highlights than other techniques that have been utilized for this purpose. The H-space bump mapping algorithm of the present invention was designed for implementation with the H-space lighting algorithm. In other words, the H-space lighting algorithm has been significantly modified to produce the H-space bump mapping algorithm of the present invention. The H-space bump mapping algorithm produces excellent bump-mapped images, as will be demonstrated by the discussion of FIGS. 3–11 and by the pseudo code of the algorithm of the present invention set forth below.

The H-space lighting and bump mapping algorithms are performed by the fragment lighting component 33 of the fragment processor 30. The concept of H-space is based on a two-dimensional (2D) coordinate system in the plane of a triangle. The two dimensions correspond to the U and V components of a unit-length vector projected onto this two-dimensional coordinate system. The 2D vector (0,0) corresponds to a direction parallel to the surface normal of the triangle. Thus, the dot product of the surface normal of the triangle and any given vector in H-space, which will be represented herein by $(h_u, h_v)$, is the same as the implied height above the plane, which is equal to $\sqrt{1-h_u^2-h_v^2}$. The aforementioned H-space lighting algorithm can be described by the following pseudo code. It should be noted that vectors are represented herein by upper case alphanumeric characters, whereas scalars are represented by lower case alphanumeric characters.

H-Space Lighting Alorithm

For each triangle:
/* Setup a 2 dimensional coordinate
* System (H-space) for each vertex. This
* coordinate system will be perpendicular
* to the surface normal of the triangle at each
* vertex.
* T is the first triangle edge
* N is the surface normal of the triangle at each
* vertex
* U is the U reference vector at each vertex
* V is the V reference vector at each vertex
* L is a Light vector
* E is an Eye vector
* H is a Light/Eye half angle vector
*/

For each vertex
U=T×N /* cross product of the triangle edge and the surface normal */
V=N×U /* cross product of the surface normal N and the U reference vector */
H=(L+E) / |L+E|/* calculation of light/eye half-angle vector */
$h_u$=H·U/* dot product of H and U */
$h_v$=H·V/* dot product of H and V */
End /* for each vertex */
For each pixel
Interpolate half-angle corrdinates, $h_u$ and $h_v$
Dot_sq=1-$h_u^2$-$h_v^2$
S=dot_sq$^{(SpecPower/2)}$
fragment specular=S * specular color
fragment color=fragment color+fragment specular
Perform normal fragops
End /* for each pixel */
End /* for each triangle */

The term dot_sq=$(1-h_u^2-h_v^2)$ is a calculation of $(N·H)^2$. The term "S" is the specular lighting term, which is multiplied by the specular material property of the material.

The net result of the H-space lighting algorithm is specular highlights in the scene that have a superior appearance to the normal Gouraud-shaded scenes, even for coarsely tesselated objects. Neither diffuse lighting nor bump mapping are performed by the H-space lighting algorithm represented by this pseudo code.

In accordance with the present invention, it has been determined that bump mapping may be generated by adding displacements to the interpolated $h_u, h_v$ coordinates before the value of Dot_sq is calculated. Generally, these displacements are generated by the texture mapping component 32 and are stored in a texture map (not shown). The modified coordinates are then output to the fragment lighting component 33 where they are then used to perform the lighting and bump mapping tasks. The manner in which the H-space lighting algorithm has been modified to perform H-space bump mapping in accordance with the preferred embodiment of the present invention will now be described.

Setup Modification To Support H-Space Bump Mapping

One modification to the H-space lighting algorithm is that the per-polygon setup has been changed. Rather than computing the U reference vector from the plane normal and a polygon edge, the U reference vector is calculated based on the texture coordinate gradient vector associated with the S texture coordinates and the plane normal. Similarly, the V reference vector is generally also determined based on the texture coordinate gradient vector associated with the T texture coordinates and the plane normal. This eliminates the need to transform $h_u, h_v$ or the bump displacement per pixel. The aforementioned H-Space lighting algorithm creates a U,V coordinate system of arbitrary orientation. If this same arbitrary coordinate system were used in the H-Space Bump Mapping computations, there would be a need to transform the resulting $h_u, h_v$ values into the coordinate system of the bump map's texture coordinates. To avoid the need for this transformation, the U, V reference vectors are initially set up Such that they are generally aligned with the S and T texture coordinate space. However, it should be noted that the aforementioned technique of transforming the resulting $h_u, h_v$ values into the coordinate system of the bump map's texture coordinates could be used in accordance with the present invention, although it is not preferable to do so.

The variables (s, t) are the texture coordinates for a given triangle vertex. The texture coordinate gradient vector, $G_s$, associated with the s texture coordinate is defined as the vector: {ds/dX, ds/dY, ds/dZ}, where X, Y and Z correspond to eye coordinates. The texture coordinate gradient vector, $G_t$, associated with the t texture coordinate is defined as the vector: {dt/dX, dt/dY, dt/dZ}. The $G_t$ texture coordinate gradient vector is calculated in order to determine which direction is "up" in the local coordinate system.

The preferred manner in which these gradient vectors are calculated will now be described with reference to pseudo code. It should be noted that the gradient calculations preferably are performed prior to performing the H-space bump mapping algorithm of the present invention, although this is not necessary. The gradient calculations could be performed as part of the H-space bump mapping algorithm of the present invention. It should also be noted that it is possible to perform the gradient calculations in a variety of ways, as will be understood by those skilled in the art. The present invention is not limited to any particular algorithm for performing the gradient calculations.

In the gradient calculations represented by the pseudo code below, $XYZ_0$ represents the (x,y,z) coordinates associated with vertex 0. Similarly, $XYZ_1$ and $XYZ_2$ represent the (x,y,z) coordinates associated with vertices 1 and 2, respectively. $ST_0$ represents the (s, t) texture coordinates associated with vertex 0. $ST_1$ and $ST_2$ represent the (s, t) texture coordinates associated with the vertices 1 and 2, respectively.

Calculation of the Texture Coordinate Gradient Vectors $G_s$ represents the texture coordinate gradient vector for the s texture coordinates $G_t$ represents the texture coordinate gradient vector for the t texture coordinates $XYZ_0$
$XYZ_1$ these are the (x,y,z) vertex positions
$XYZ_2$
$ST_0$
$ST_1$ these are the (s,t) vertex texture positions
$ST_2$
$D_1$ is the vector from vertex 0 to vertex 1
$D_2$ is the vector from vertex 0 to vertex 2
$T_1$ is the texture coordinate delta from vertex 0 to vertex
$T_2$ is the texture coordinate delta from vertex 0 to vertex
$W_{00}$ is the dot product of $D_1$ with itself
$W_{01}$ is the dot product of $D_1$ and $D_2$
$W_{02}$ is the dot product of $D_2$ with itself
$D_1 = XYZ_1 - XYZ_0$
$D_2 = XYZ_2 - XYZ_0$
$T_1 = ST_1 - ST_0$
$T_2 = ST_2 - ST_0$
$W_{00} = D_1 \cdot D_1$
$W_{01} = D_1 \cdot D_2$
$W_{02} = D_2 \cdot D_2$
Denom = $1 / (W_{00} * W_{11} - W_{01} * W_{01})$ (what is $W_{11}$)
$p_s = (T_1 s * W_{11} + T_2 s * W_{01}) *$ denom
$q_s = (T_2 s * W_{00} + T_1 S * W_{01}) *$ denom
$G_s = p_s * D_1 + q_s * D_2$
$p_t = (T_1 t * W_{11} + T_2 t * W_{01}) *$ denom
$q_t = (T_2 t * W_{00} + T_1 t * W_{01}) *$ denom
$G_t = p_t * D_1 + q_t * D_2$ Another major setup difference between the H-space lighting algorithm and the H-space bump mapping algorithm of the present invention is that, in addition to the $h_u, h_v$ coordinates of the half-angle vector, H, being interpolated, the $l_u, l_v$ coordinates of the light direction vector, L, are also interpolated. The parameter $l_d$ generated by calculating the dot product of the normal, N, and the light direction vector, L, is also interpolated. The parameter $h_d$ generated by calculating the dot product of the normal, N, and the half-angle vector, H, is also interpolated. The $l_d$ and $h_d$ parameter information is used to determine when a portion of the image is in a "shadow" area, i.e., an area that is not highlighted.

The $h_u, h_v$ coordinates are used to compute a specular lighting term. The $l_u, l_v$ coordinates are used to compute a diffuse lighting term. As stated above, the H-Space lighting algorithm only computed a specular term per fragment. In accordance with the present invention, it has been determined that bump mapping requires both a specular term and a diffuse term. Hence, the coordinates $l_u, l_v$ are utilized in the algorithm of the present invention to provide the diffuse lighting term.

On a per-pixel basis, some differences exist between the H-space lighting algorithm discussed above and the H-space bump mapping algorithm of the present invention. Firstly, perturbations are added in, if desired, to achieve the bump effect. Secondly, the $l_u, l_v$ coordinates for the diffuse lighting term are interpolated, perturbed and then the height is calculated. The projection of a unit length vector (a vector of length 1) onto a plane produces values/coordinates in a 2 dimensional coordinate system. In the present case, these are ($h_u, h_v$) and ($l_u, l_v$). What is needed in the lighting computations is the height of this unit length vector above the plane. This height is calculated as $\text{sqrt}(1 - h_u^2 - h_v^2)$. Thirdly, the bump mapping algorithm is capable of providing bumps in portions of triangles that are technically "backfacing" with respect to the light, whereas the H-space lighting algorithm does not even perform specular lighting in portions of triangles that are technically "backfacing". In accordance with the present invention, it has been determined that it is generally preferable to have bump mapping effects drop off gradually near the "backfacing" boundary of an object rather than to have the bump mapping effects stop abruptly at the "backfacing" boundary. The pseudo code for the H-space bump mapping algorithm of the present invention is set forth below:

H-Space Bump Mapping Algorithm of the Invention

```
For each vertex
    /* Calculate U and V reference vectors
    * Note: the manner in which this is done is
    * different from the H-space lighting algorithm
    * discussed above
    *
    * U reference vector is generally aligned
    * with G_s, which is the s-coordinate texture
    * gradient vector
    *
    * V reference is generally aligned
    * with G_t, which is the t-coordinate gradient
    * vector
    */
    Temp=|G_t×N|  /* cross product */
    U=|N×TEMP|
```

```
        if ((Gs·temp)>0) then
            V=TEMP
        else
            V=-TEMP
        end
    /* Calculate h_u, h_d and h_v per vertex */
    H=(L+E) / |L+E|
    h_u=H·U
    h_v=H·V
    h_d=H·N
End /* for each vertex */
    /* Bump mapping algorithm needs to be
     * applied to both the specular and
     * diffuse lighting terms. Therefore, in addition
     * to calculating h_u, h_v, and h_d, calculate l_u, l_v and l_d per
       vertex */
    l_u=L·U
    l_v=L·V
    l_d=L·N
For each pixel
    Interpolate l_u, l_v, l_d, h_u, h_v, and h_d
    Look up Bump displacement, d_u and d_v, for the corresponding texture coordinates
    Calculate diffuse term
    shAdj=0
    If bump mapping, then
        If (l_d<0.0) then
            ShAdj=2*(1-l_u^2-l_v^2)
        end
        l_u=l_u-d_u
        l_v=l_v-d_v
    end
        dot_sq=1-l_u^2-l_v^2-shAdj
    diff=0.0
    if (dot_sq>0.0) then
        diff=sqrt (dot_sq)
    end
    /* Calculate Specular term */
    spec=0.0
    if C(h_d>0) AND (diff>0) then
        If bump mapping then
            h_u=h_u-d_u
            h_v=h_v-d_v
        end
        dot_sq=1-h_u^2-h_v^2
        if (dot_sq>0.0) then
            spec=dot_sq^(specPower/21)
        end
    end
    /* Calculate fragment color */
    C_f=C_a+diff*C_d+spec*C_s
End
```

The variable $C_f$ represents the color for the particular pixel, or fragment. The variables $C_a$, $C_d$ and $C_s$ represent the ambient material color, the diffuse material color, and the specular material color, respectively, for the particular fragment. It should be noted that the color calculations take into account the diffuse ("diff") and specular ("spec") bump mapped lighting terms.

The algorithm of the present invention has been implemented in the C programming language. As implemented, the algorithm of the present invention utilizes flags to enable and disable diffuse and specular bump mapping separately, and to control the bump height and tesselation of the object, which provides the user with great flexibility in determining how the rendered image will appear. Those skilled in the art will understand that it is not necessary that the bump mapping algorithm of the present invention be implemented in any particular language or in any particular manner.

Figure 3:
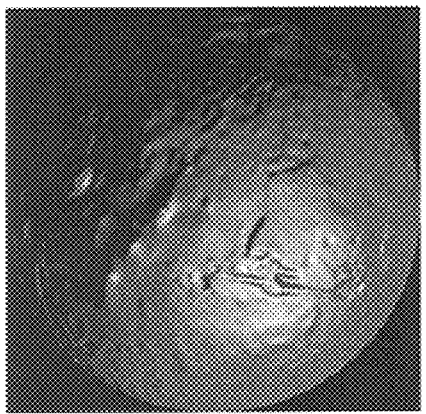
FIG. 3 is a graphics image of a height map of the planet mars wrapped onto a sphere image that is bump mapped over the entire scene, which includes specular and diffuse lighting components.

The figures discussed below generally demonstrate different and/or comparative effects obtained by using the bump mapping algorithm of the present invention and by varying certain parameters of the algorithm. FIG. 3 illustrates a height map of Mars wrapped onto a sphere. This sphere was relatively highly tessellated. The light source is directional, with a specular color of white and a specular exponent of 16. The bump map itself utilized in creating this image has a resolution of 512 by 256 pixels. The resolution of the bump map provides a general metric of the quality of the overall bump mapping algorithm. The image also has a diffuse lighting component that is bump mapped. The H-space bump mapping algorithm of the present invention is able to generate very high quality bump mapped images without having to use excessively large bump maps. The detail beyond the shadow terminator should be noted. This demonstrates that the algorithm of the present invention can be configured such that the bumps drop off gradually near the shadow (or backfacing) terminator.

Figure 4:
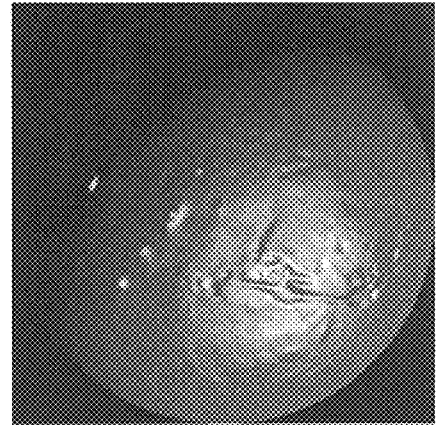
FIG. 4 is a graphics image that is similar to that shown in FIG. 3 except that the image is only bump mapped over the specular lighting component.
Figure 5:
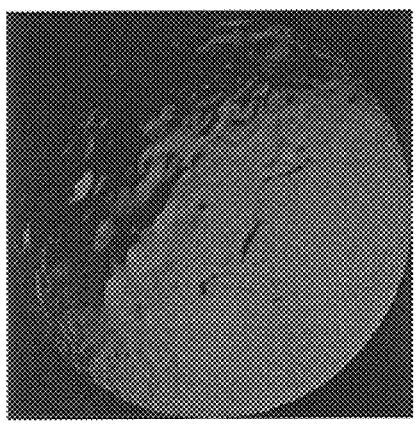
FIG. 5 is a graphics image that is similar to the images shown in FIGS. 3 and 4 except that the image is only bump mapped over the diffuse lighting component.

FIG. 4 utilizes the same data, but without the diffuse lighting component being bump mapped. The comparative lack of detail, especially beyond the shadow terminator, should be noted. FIG. 5 generally utilizes the same data as that utilized for FIGS. 3 and 4, but with no specular highlighting. As can be seen, the image shown in FIG. 5 appears dull and lifeless. This indicates that bump mapping should be used on both diffuse and specular areas of the image to achieve the full benefit of implementing the H-space lighting and H-space bump mapping algorithms together as a single algorithm, as is the case with the image shown in FIG. 3.

Figure 6:
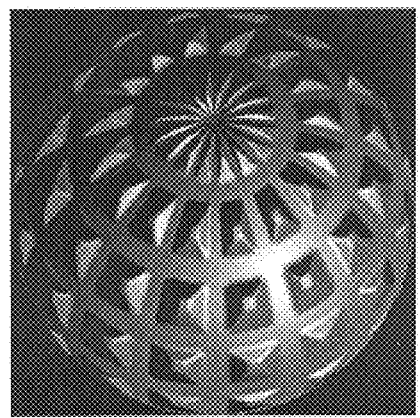
FIG. 6 is a graphics image of the sphere used in FIGS. 3, 4 and 5 except that it is fully bump mapped, specularly highlighted on the forward side of the shadow terminator, and diffuse beyond the shadow terminator.
Figure 7:
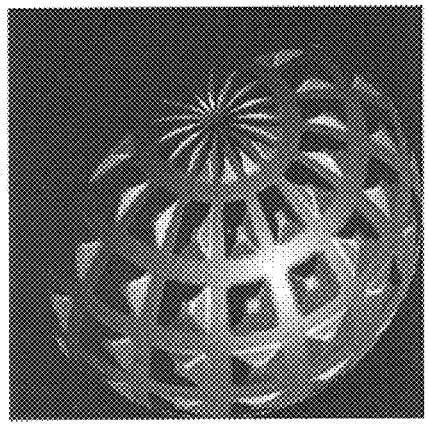
FIG. 7 is a graphics image that is generally the same as that shown in FIG. 6 except that bump mapping stops at the backfacing terminator.

FIGS. 6 and 7 compare the effect of bump mapping beyond the shadow terminator versus just cutting the effect of bump mapping off at that point, respectively. To many people, the image shown in FIG. 6 appears more "realistic," even though a real sphere would show no bumps at a sufficient distance across the terminator. This is probably due to two effects: (1) on a real sphere, some of the bumps would push themselves out of the shadow, and (2) in real scenes there is enough direction to the "ambient" light to still see detail. In the pseudo code representing the H-space bump mapping algorithm of the present invention, for per pixel calculations, the calculations for bump mapping past the shadow terminator need only be performed for the diffuse lighting component. One reason for this is to reduce computation. The other is that visible bump mapping effects in this region are largely due to the directional characteristics of ambient light in this region. This sort of ambient light would not generate specular highlights. Therefore, it is unnecessary to perform bump mapping calculations for pixels past the shadow terminator for the specular lighting term. It can be seen in the pseudo code that the "shAdj" term is only used in the diffuse calculations. It is the "shAdj" term that allows bump mapping effects to be visible beyond the "backfacing" or "shadow" terminator. Specular effects would not occur naturally in this "backfacing" region and this algorithm accounts for that.

A few comments should be made to clarify the calculation of the shAdj term. As the Normal, N, and Light, L, vectors approach 90° from each other, the sum of $l_u^2+l_v^2$ approaches 1.0. When the Normal and Light vectors are greater than 90° from each other, the sum of $l_u^2+l_v^2$ is again less than 1.0. It is desirable to obtain the computational effect of having $l_u^2+l_v^2$ continue to increase in value to values greater than 1.0. It would be more accurate mathematically to calculate shAdj as: $2*(1-\text{Sqrt}(l_u^2+l_v^2))$. However, experimentation has shown that little or no visible effect occurs from dropping the Sqrt( ) term from this expression. It should be note that if $l_u^2+l_v^2$ is in the range 0 to 1 then $\text{Sqrt}(l_u^2+l_v^2)$ is also in the range 0 to 1. The curves of the two functions share the endpoints of 0 and 1 and differ only in their shape.

Figure 8:
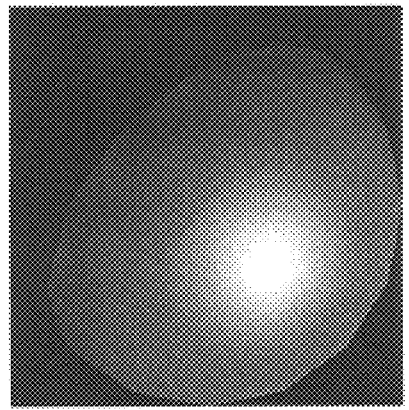
FIG. 8 demonstrates a graphics image having faceting artifacts that may result by using the H-space bump mapping technique of the present invention with low tesselations and extremely smooth bump mapping. This figure also demonstrates that the image generated in accordance with the present invention still has a superior appearance to a Gouraud image even under these conditions.
Figure 9:
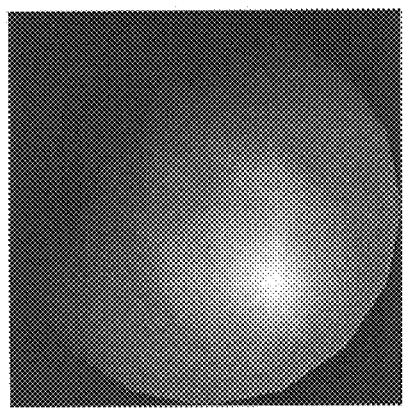
FIG. 9 demonstrates a Gouraud image generated using the same tesselations used to generate the image shown in FIG. 8.

One potential drawback of the H-Space bump mapping algorithm of the present invention is the creation of an image having a "faceted" appearance that shows up at low tesselations when extremely smooth bump maps are used to generate the image. FIG. 8 illustrates this faceting. However, this image still has much better quality than a Gouraud shaded picture of the same resolution, which is shown in FIG. 9. As is the case with the aforementioned H-Space lighting algorithm, in accordance with the H-space bump mapping algorithm of the present invention, increasing the tesselation substantially decreases artifacts in the image rendered. Additionally, if the bumps are at all visible, the faceted appearance also decreases substantially, which is most likely a result of the noise associated with tesselation removing the color correlation that the human eye needs to detect the facets.

Figure 10:
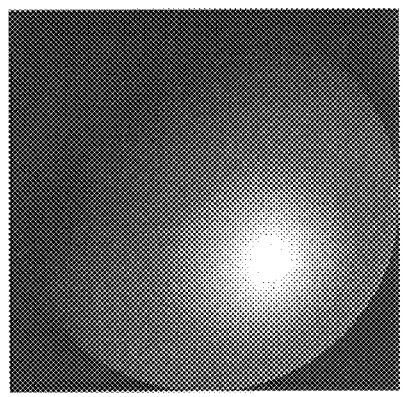
FIG. 10 demonstrates an image that is similar to the image shown in FIG. 8, but which has greater tesselation and which is slightly bump mapped. The artifacts present in the image shown in FIG. 8 are not present in the image shown in FIG. 10.
Figure 11:
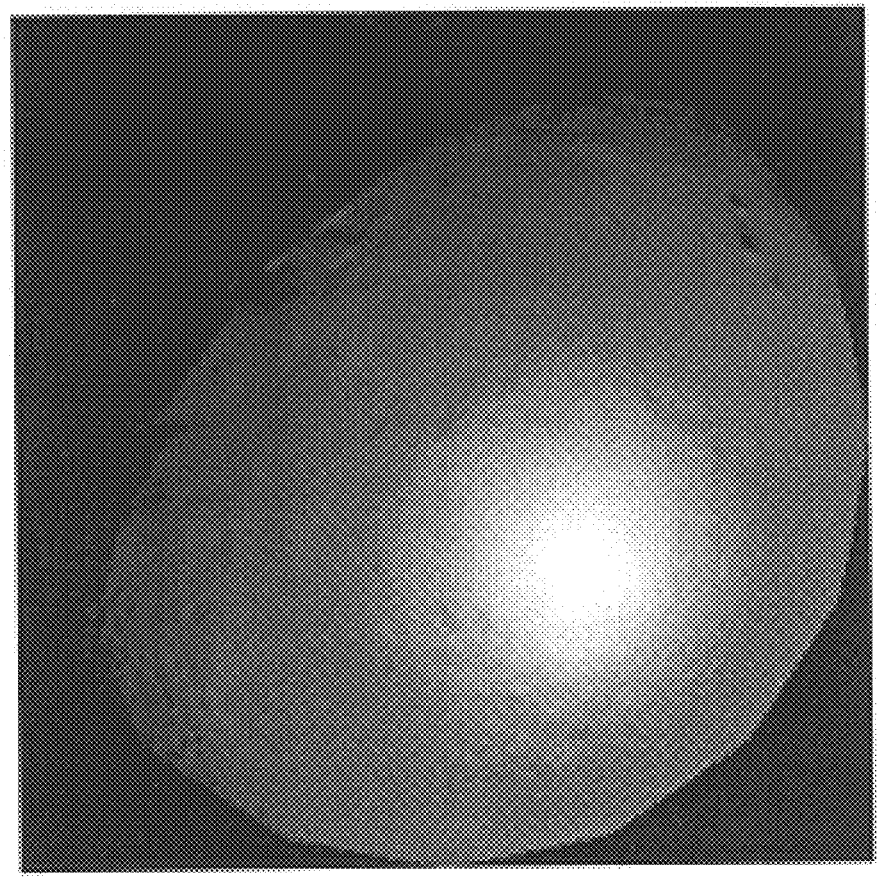
FIG. 11 demonstrates an image that has the same tesselation as the image shown in FIG. 8. but with a bump map that is much less smooth than that associated with the image shown in FIG. 10. The artifacts present in the image shown in FIG. 8 are still not present in the image shown in FIG. 11.

FIGS. 10 and 11 demonstrate the manner in which the visibility of bumps decreases the appearance of facets. FIG. 10 demonstrates an image that is generated in a manner similar to the manner in which the image shown in FIG. 8 is generated. However, the image shown in FIG. 10 is generated with greater tessellation than the image shown in FIG. 8. The artifacts present in the image shown in FIG. 8 are not present in the image shown in FIG. 10. Similarly, FIG. 11 demonstrates an image that is generated in a manner similar to the manner in which the image shown in FIG. 8 is generated. However, the image shown in FIG. 11 is generated utilizing a bump map that is much less smooth than that associated with the image shown in FIG. 10. The artifacts present in the image shown in FIG. 8 are not present in the image shown in FIG. 11. Therefore, faceting artifacts can also be eliminated by utilizing bump mapping.

Therefore, it can be seen from the figures and the discussion thereof that the H-Space bump mapping algorithm of the present invention results in practical looking results, and generates very nice looking images. In particular, the bump mapping algorithm of the present invention combines the low texture storage requirements of the well known Blinn-style bump mapping (2 bytes per texel) technique with the low per-pixel computational cost of H-Space lighting.

Figure 12:
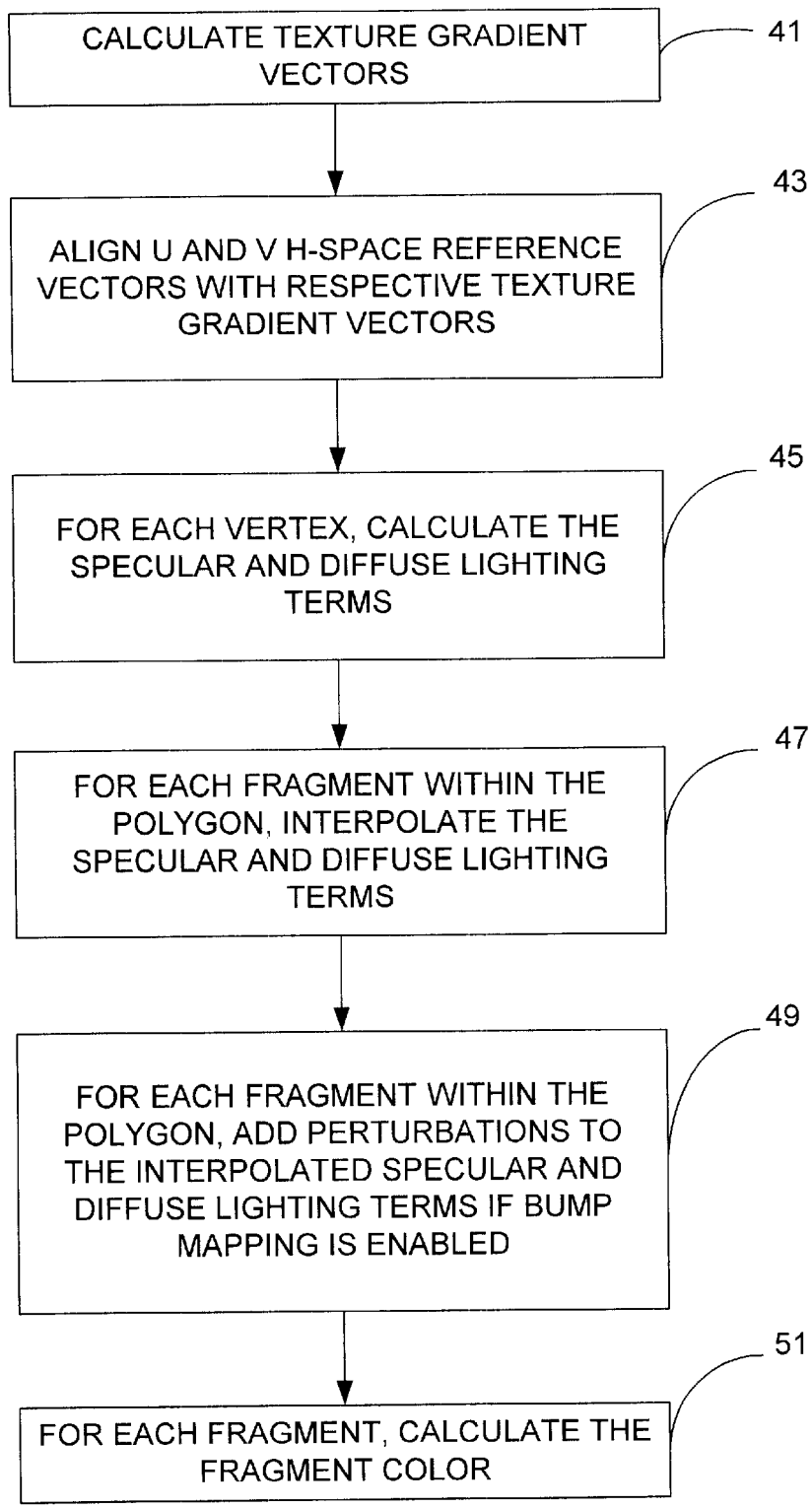
FIG. 12 is a flow chart illustrating the H-space bump mapping algorithm of the present invention in accordance with the preferred embodiment.

FIG. 12 is a flow chart generally illustrating the method of the present invention for performing the H-space bump mapping algorithm. The texture coordinate gradient vectors are first calculated to enable the U and V H-space reference vectors to be aligned with the texture coordinate gradient vectors. This step is presented by block 41. As stated above, preferably this step is not part of the H-space bump mapping algorithm, but is performed prior to the execution of the bump mapping algorithm. The U and V reference vectors are then aligned with the texture coordinate gradient vectors associated with the S and T texture coordinates, respectively, as indicated by block 42. For each vertex of the polygon being processed, the specular and diffuse lighting terms are calculated in the manner shown in the H-space bump mapping pseudo code. This step is indicated by block 45. Both of these calculations utilize the U and V reference vectors that have been aligned with the texture coordinate gradients. The specular and diffuse lighting terms for each vertex are then interpolated to obtain the specular and diffuse lighting terms associated with the fragments within the polygon defined by the vertices. This step is indicated by block 47.

Bump mapping, if enabled, is then performed by adding perturbations to the interpolated specular and diffuse lighting terms, as indicated by block 49. The color of each pixel is then calculated, as indicated by block 51. This calculation is performed by using the specular, diffuse and ambient lighting terms associated with the pixel as well as the diffuse and specular bump mapped lighting terms, as discussed above with reference to the pseudo code.

It should be noted that the present invention has been described in accordance with preferred embodiments for purposes of illustration only. The present invention is not limited to these embodiments. As stated above, the H-space bump mapping algorithm preferably is performed in hardware in the graphics system 15. However, those skilled in the art will understand that this algorithm could also be performed in software, which may reside on a computer-readable medium of some sort until executed by some type of processor. Such computer-readable mediums include, but are not limited to, optical storage devices, magnetic storage devices, electrical storage devices, such as solid state storage devices, etc. It will be apparent to those skilled in the art that modifications, in addition to those specifically mentioned, may be made without deviating from the spirit and scope of the present invention.

What is claimed is:

1. An apparatus for performing H-space lighting and bump mapping for an image to be rendered, the apparatus comprising a fragment lighting component, the fragment lighting component comprising:
   logic that computes H-space specular and diffuse lighting terms for each vertex of a polygon being processed by the fragment lighting component; and
   logic that interpolates the H-space specular and diffuse lighting terms for each pixel within a region encompassed by the polygon being processed.

2. The apparatus of claim 1, further comprising logic that adds perturbations to the interpolated specular and diffuse lighting terms to effectuate bump mapping.

3. The apparatus of claim 2, wherein prior to computing the H-space specular and diffuse lighting terms, the fragment lighting component aligns H-space vertex reference vectors with texture coordinate gradient vectors, wherein once the H-space vertex reference vectors have been aligned with the texture coordinate gradient vectors, the logic that computes H-space specular and diffuse lighting terms computes the specular and diffuse lighting terms for each vertex of the polygon being processed using the aligned H-space vertex reference vectors.

4. The apparatus of claim 3, wherein once the logic that computes H-space specular and diffuse lighting terms has computed the aligned H-space vertex reference vectors and has computed the H-space specular and diffuse lighting terms associated with the vertices of the polygon being processed, the logic that interpolates the H-space specular and diffuse lighting terms utilizes the H-space specular and diffuse lighting terms associated with the vertices of the polygon being processed to interpolate the H-space specular and diffuse lighting terms of the pixels within the polygon.

5. The apparatus of claim 4, wherein the logic that adds perturbations is capable of being controlled such that perturbations are added to the H-space specular and/or diffuse lighting terms.

6. The apparatus of claim 5, wherein the fragment lighting component is comprised as part of a graphics pipeline of a computer graphics display system.

7. The apparatus of claim 6, wherein each logic is implemented in hardware.

8. The apparatus of claim 2, wherein the computed H-space specular and diffuse lighting terms define a two-dimensional representation of at least one three-dimensional vector indicative of light direction.

9. The apparatus of claim 8, wherein the three-dimensional vector is a half-angle vector associated with a light vector and a view vector.

10. A computer graphics display system comprising a graphics system that processes image data associated with an image to be rendered on a display device of the computer graphics display system, said graphics system being capable of performing H-space lighting and bump mapping, said graphics system comprising:

a fragment lighting component comprising logic for computing H-space specular and diffuse lighting terms for each vertex of a polygon being processed by the fragment lighting component and logic for interpolating the H-space specular and diffuse lighting terms for each pixel within a region encompassed by the polygon being processed.

11. The apparatus of claim 10, further comprising logic configured to add perturbations to the interpolated specular and diffuse lighting terms to effectuate bump mapping.

12. The computer graphics display system of claim 11, wherein prior to computing the H-space specular and diffuse lighting terms, the fragment lighting component aligns H-space vertex reference vectors with texture coordinate gradient vectors, wherein once the H-space vertex reference vectors have been aligned with the texture coordinate gradient vectors, the logic for computing H-space specular and diffuse lighting terms computes the H-space specular and diffuse lighting terms for each vertex of the polygon being processed using the aligned H-space vertex reference vectors.

13. The computer graphics display system of claim 12, wherein once the logic for computing specular and diffuse lighting terms has computed the aligned H-space vertex reference vectors and has computed the specular and diffuse lighting terms associated with the vertices of the polygon being processed, the logic for interpolating the specular and diffuse lighting terms utilizes the H-space specular and diffuse lighting terms associated with the vertices of the polygon being processed to interpolate the H-space specular and diffuse lighting terms of the pixels within the polygon.

14. The computer graphics display system of claim 13, wherein the logic for adding perturbations is capable of being controlled such that perturbations are added to the H-space specular and/or diffuse lighting terms, thereby enabling the effect of bump mapping to be controlled.

15. The computer graphics display system of claim 14, wherein the fragment lighting component is implemented in hardware.

16. A method for performing H-space lighting and bump mapping for an image to be rendered, the method being implemented in a fragment lighting component, the method comprising the steps of:

computing H-space specular and diffuse lighting terms for each vertex of a polygon being processed by the fragment lighting component; and interpolating the H-space specular and diffuse lighting terms for each pixel within a region encompassed by the polygon being processed.

17. The apparatus of claim 16, further comprising adding perturbations to the interpolated specular and diffuse lighting terms to effectuate bump mapping.

18. The method of claim 17, wherein prior to computing the H-space specular and diffuse lighting terms for each vertex, H-space vertex reference vectors are aligned with texture coordinate gradient vectors, wherein once the H-space vertex reference vectors have been aligned with the texture coordinate gradient vectors, the H-space specular and diffuse lighting terms are computed for each vertex of the polygon being processed using the aligned H-space vertex reference vectors.

19. The method of claim 18, wherein once the H-space specular and diffuse lighting terms associated with the vertices of the polygon being processed have been computed, the specular and diffuse lighting terms associated with the vertices of the polygon being processed are used to interpolate the H-space specular and diffuse lighting terms of the pixels within the polygon.

20. The method of claim 19, wherein the process of adding perturbations to the H-space specular and/or diffuse lighting terms can be controlled so that the H-space specular and/or diffuse lighting terms can be controllably bump-mapped.

21. The method of claim 20, wherein the steps of computing H-space specular and diffuse lighting terms for each vertex of a polygon being processed by the fragment lighting component, of interpolating the H-space specular and diffuse lighting terms for each pixel within a region encompassed by the polygon being processed, and of adding perturbations to the H-space specular and diffuse lighting terms to effectuate bump mapping, are performed in hardware.

22. The method of claim 20, wherein the steps of computing H-space specular and diffuse lighting terms for each vertex of a polygon being processed by the fragment lighting component, of interpolating the s H-space specular and diffuse lighting terms for each pixel within a region encompassed by the polygon being processed, and of adding perturbations to the H-space specular and diffuse lighting terms to effectuate bump mapping, are performed in software.

23. A computer program for performing H-space lighting and bump mapping for an image to be rendered, the computer program being embodied on a computer-readable medium, the program comprising:

a code segment for computing H-space specular and diffuse lighting terms for each vertex of a polygon being processed;

a code segment for interpolating the H-space specular and diffuse lighting terms for each pixel within a region encompassed by the polygon being processed; and a code segment for causing perturbations to be added to the H-space specular and/or diffuse lighting terms to effectuate bump mapping.

24. The computer program of claim 23, further comprising a code segment for determining texture coordinate gradient vectors associated with the image to be rendered and aligns H-space vertex reference vectors with the texture coordinate gradient vectors prior to computing the H-space specular and diffuse lighting terms for each vertex, wherein once the H-space vertex reference vectors have been aligned with the texture coordinate gradient vectors, the H-space specular and diffuse lighting terms are computed for each vertex of the polygon being processed using the aligned H-space vertex reference vectors.

25. The computer program of claim 24, wherein the code segment for adding perturbations controllably adds perturbations to the H-space specular and/or diffuse lighting terms such that the H-space specular and/or diffuse lighting terms are controllably bump-mapped.

26. The computer program of claim 25, wherein the computer program is executed by a host central processing unit of a computer graphics display system.

* * * * *